(12) United States Patent
Moutafis

(10) Patent No.: US 8,387,963 B2
(45) Date of Patent: Mar. 5, 2013

(54) CLAMP

(75) Inventor: Timothy E. Moutafis, Gloucester, MA (US)

(73) Assignee: Belmont Instrument Corporation, Billerice, MA (US)

( * ) Notice: Subject to any disclaimer, the term of this patent is extended or adjusted under 35 U.S.C. 154(b) by 256 days.

(21) Appl. No.: 12/383,496

(22) Filed: Mar. 25, 2009

(65) Prior Publication Data

US 2010/0244349 A1   Sep. 30, 2010

(51) Int. Cl.
*B25B 1/08* (2006.01)
*B25B 1/20* (2006.01)
*B25B 1/02* (2006.01)
*B25B 5/02* (2006.01)
*B25B 7/12* (2006.01)
*B25B 5/08* (2006.01)

(52) U.S. Cl. .......... 269/236; 269/41; 269/196; 269/212; 81/367

(58) Field of Classification Search .......... 269/236, 269/97, 136, 47, 41, 212, 196, 268, 43; 81/367, 81/374, 379
See application file for complete search history.

(56) References Cited

U.S. PATENT DOCUMENTS

| | | | | |
|---|---|---|---|---|
| 201,591 A * | 3/1878 | Breckenridge | ............... | 269/159 |
| 636,661 A * | 11/1899 | Guest | ............... | 269/196 |
| 1,084,489 A * | 1/1914 | Schmutz | ............... | 269/212 |
| 2,327,368 A * | 8/1943 | Olson | ............... | 81/374 |
| 2,359,530 A * | 10/1944 | Rose | ............... | 269/43 |
| 2,420,165 A * | 5/1947 | Clutter | ............... | 269/47 |
| 3,354,759 A * | 11/1967 | Cook | ............... | 81/379 |
| 3,630,068 A * | 12/1971 | Floyd, Jr. | ............... | 72/409.08 |
| 3,716,879 A * | 2/1973 | Boyajian | ............... | 7/134 |
| 3,824,669 A * | 7/1974 | Hilton | ............... | 29/56.6 |
| 4,021,516 A * | 5/1977 | Stevenson | ............... | 269/41 |
| 4,162,804 A * | 7/1979 | Davies | ............... | 294/101 |
| 4,285,086 A * | 8/1981 | Whyte | ............... | 15/119.2 |
| 4,299,377 A * | 11/1981 | Lenz | ............... | 269/136 |
| 4,475,726 A * | 10/1984 | Smith | ............... | 269/41 |
| 4,499,797 A * | 2/1985 | Wilson | ............... | 81/367 |
| 4,566,304 A * | 1/1986 | Van Cleave et al. | ............ | 72/319 |
| 4,884,792 A * | 12/1989 | Rendahl et al. | ............... | 269/236 |
| 5,460,065 A * | 10/1995 | Balmer | ............... | 81/368 |
| 5,848,783 A * | 12/1998 | Weissenborn | ............... | 269/97 |
| 5,857,737 A * | 1/1999 | Fraser | ............... | 269/236 |
| 6,042,495 A * | 3/2000 | Patterson et al. | ............... | 474/80 |
| 6,095,508 A * | 8/2000 | Baraldi et al. | ............... | 269/97 |
| 6,175,998 B1 * | 1/2001 | Leo | ............... | 29/268 |
| 6,325,733 B1 * | 12/2001 | Patterson et al. | ............... | 474/80 |
| 6,330,965 B1 * | 12/2001 | Milliman et al. | ............... | 227/176.1 |
| 2007/0187881 A1 * | 8/2007 | Dixon | ............... | 269/236 |
| 2009/0016861 A1 * | 1/2009 | Suga et al. | ............... | 414/222.13 |
| 2010/0066001 A1 * | 3/2010 | Dixon | ............... | 269/236 |

* cited by examiner

*Primary Examiner* — Lee D Wilson
*Assistant Examiner* — Alvin Grant
(74) *Attorney, Agent, or Firm* — Morris I. Pollack

(57) ABSTRACT

A device is provided for use to securely clamp a medical mechanism to a person carrier, such as a lifter, stretcher, gurney, or the like, to facilitate providing medical treatment to a person during transport of the person to a medical facility, The device has an open condition released from the person carrier and a closed condition whereupon it clamps very securely to a rail of the person carrier; with the material of the person carrier facilitating securing to the person carrier the device as well as the medical mechanism to be secured to the person carrier. The medical mechanism may, by way of example, be a relatively heavy mechanism for providing infusate to the person or a relatively heavy control for the infusate providing device. No matter what it could be severely damaging to the person on the carrier, medical personnel and transport personnel if a relatively heavy mechanism loosened from the person carrier and moved uncontrolled around the transport.

15 Claims, 7 Drawing Sheets

CLAMP

BACKGROUND OF THE INVENTION

1. Field of Application

This invention relates to clamps and clamping mechanisms; and, more particularly, to clamping mechanisms for securely positioning a device, such as a medical device, to an injured person carrier, such as a litter, stretcher, or the like, that is to be transported, possibly, if by air wherein there may be erratic movements of the aircraft, or, if by land, wherein the terrain may produce erratic movements of the land transport.

2. Description of the Prior Art

At times, especially during armed conflicts or terrorism, people are injured. Such injuries may be quite serious and require the injured person to be placed on a stretcher, litter or like injured person carrier and transported by ambulance, helicopter or other suitable and appropriate transporter to a medical treatment facility.

Sometimes a medical device is required for the injured person while being transported to a medical treatment facility. Such medical devices could include oxygen tanks, infusing devices for blood and other infusates, devices for warming the blood or other infustate, power supplies for medical uses and devices, and the like. Keeping such medical devices close to the injured person is often accomplished by somehow associating the medical device and injured patient carrier. To facilitate transport of injured person(s) as rapidly as possible injured person carrier(s) awaiting use may be equipped, in advance, with such medical devices.

Transport of injured persons to medical facilities may at times be over relatively smooth city streets and/or highways but may also be by helicopter or other medical transport aircraft through unpredictable air currents, military ambulance over rough terrain, or combinations of such transporters. The resulting ride could therefore be subject to unforeseen air currents or rapid aircraft movements that cause the aircraft to drop suddenly, make rapid and sharp turns and otherwise continue on its journey to transport the injured person(s) to a medical facility as quickly as possible. Such rapid transporter movements require any and all medical devices to be secured against reacting to the sudden change of movements and directions by flying off into space and within the transport vehicle and possibly further injuring the injured person or injuring persons who are assisting the injured person medically and/or flying or driving the transport.

Existing equipment and mechanisms for securing medical devices to injured person carriers may have to be kluged together to avoid unwanted reactions of the medical device(s) to unforeseen and unwanted and sudden movements of the injured person transport, or, if available, may be relatively complex in construction and use, and/or excessive in weight and cost. There is purported to be a device that has similar goals, however, that device mounts on the litter by bracing on both litter 'poles' and because of it's dimensional requirements and its need for multiple structural connection that device is much heavier and costs much more to make. It may even be considered to be dangerous to the person on the litter because the supported device is held over the person on the litter.

SUMMARY OF THE INVENTION

It is therefore an object of this invention to provide a new and novel clamp.

It is another object of this invention to provide a new and novel clamp for securing a device to a carrier or holder to position the device for use.

It is another object of this invention to provide a new and novel clamp for attachment to a medical device for securing the medical device to a carrier for a person being transported to a medical facility.

It is another object of this invention to provide a new and novel clamp for securing a medical device to a carrier for an injured person.

It is another object of this invention to provide a new and novel clamp for securing a medical device to a carrier for an injured person being transported to a medical facility.

It is yet another object of this invention to provide a new and novel clamp for securing a medical device to a litter, stretcher or other patient carrier for use by a patient when being carried thereby and transported therewith.

It is yet another object of this invention to provide a new and novel clamp for securing a medical device to a litter, stretcher or other patient carrier for use by a patient when being carried thereby and transported therewith in a transport such as a helicopter, ambulance or other medical aircraft.

It is yet another object of this invention to provide a new and novel clamp for securing a medical device to a litter, stretcher or other patient carrier for use by a patient when being carried thereby and transported therewith in a transport such as a helicopter, ambulance or other medical aircraft so that the medical device remains secured to the patient carrier even through unwanted and unforeseen rapid changes in movement of the transport.

It is another object of this invention to provide a new and novel clamp for attachment to a medical device for securing the medical device to a carrier for a person being transported to a medical facility which clamp is relatively light in weight, inexpensive in cost and easy to connect to the carrier and to be disconnected therefrom.

Other objects of this invention will hereinafter become obvious from the following description of the preferred embodiments of this invention.

DESCRIPTION OF THE INVENTIVE EMBODIMENT

Figure 1:
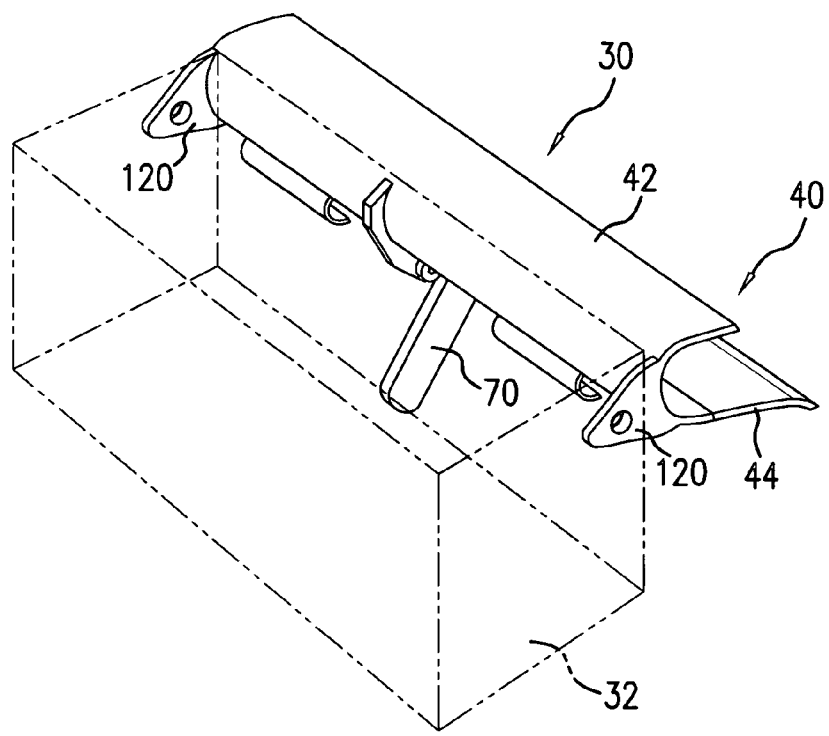
FIG. 1 is a perspective sketch of a clamp, incorporating and embodying the principles of and the instant invention, shown with a representation of a device to be carried thereby.
Figure 2:
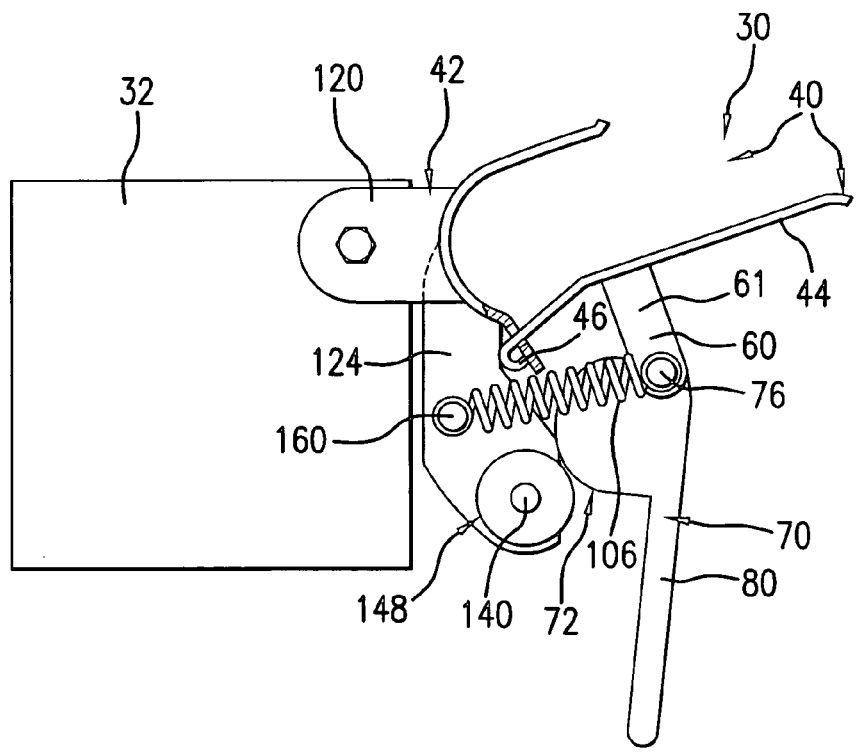
FIG. 2 is a right side elevation of the clamp of FIG. 1 with the representation of the device to be carried thereby.

With reference to FIGS. 1 and 2 there is shown a clamp 30, incorporating the instant invention and carrying, in phantom, a medical device 32. Medical device 32 may be any such device required by a person who might be in need of medical assistance and who, while waiting for such assistance and/or being transported to a medical facility, is to be monitored, have an infusion of blood or other infusate fluids, oxygen, or similar medical care.

Figure 4:
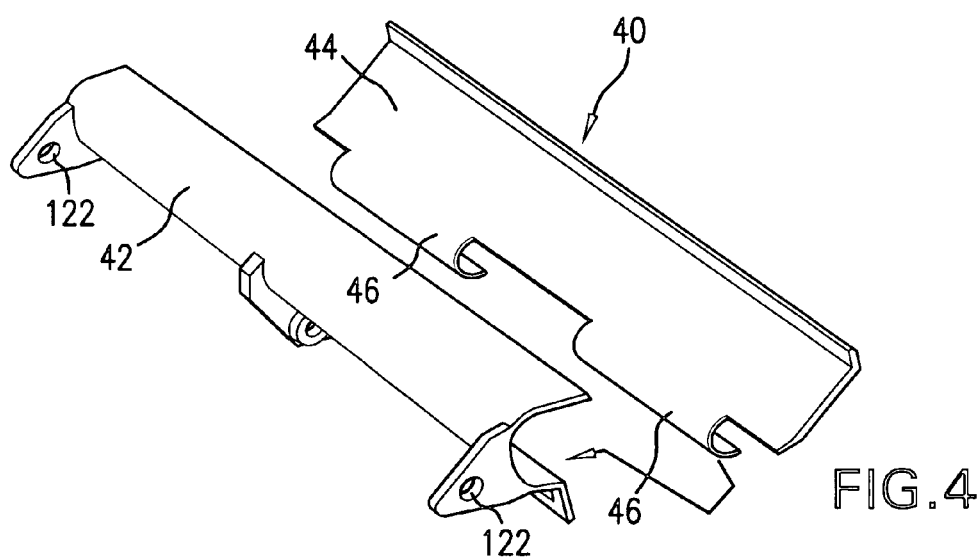
FIG. 4 is a perspective exploded view of the fixed and movable clamp plates of the clamp of FIGS. 2 and 3.
Figure 5:
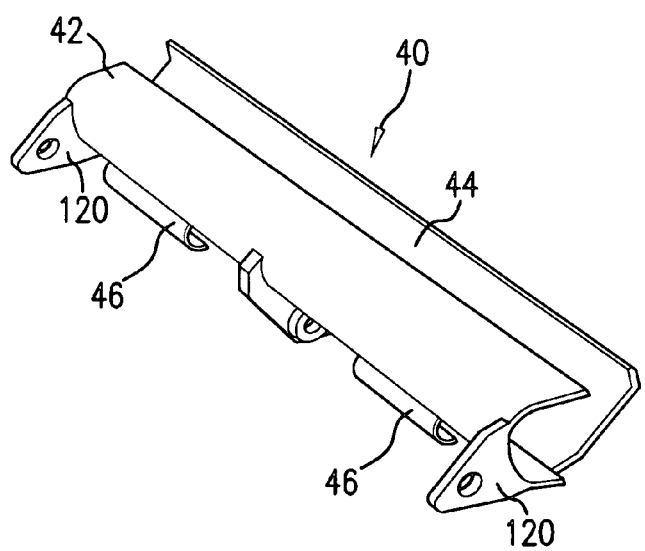
FIG. 5 is a perspective view of the fixed and movable clamp plates of the clamp of FIGS. 2 and 3 assembled together into a clamp plate assembly.

Clamp 30 (FIGS. 2 and 3) includes a clamp plate mechanism 40 (FIGS. 2-5) consisting of a stationary plate 42 and a movable plate 44 which are assembled together into mechanism 40 by inserting hinge tabs 46 (FIGS. 4-6) through hinge tab openings 48 (FIG. 6) formed in stationary clamp plate 42 with tabs 46 bent over to form a live hinge. A bracket 60 (FIGS. 2, 3, 6 and 7) extends down from movable clamp plate 44. Bracket 60 includes two bracket parts 61 (FIGS. 6 and 7) each of which includes a pivot pin hole 62 (FIG. 3) for purposes to be hereinafter described in greater detail. Bracket parts 61 may be fabricated separately and secured in, spaced relationship, beneath movable clamp plate 44 by conventional means or fabricated as a substantially "U" shaped part with spaced bracket parts 61.

Figure 3:
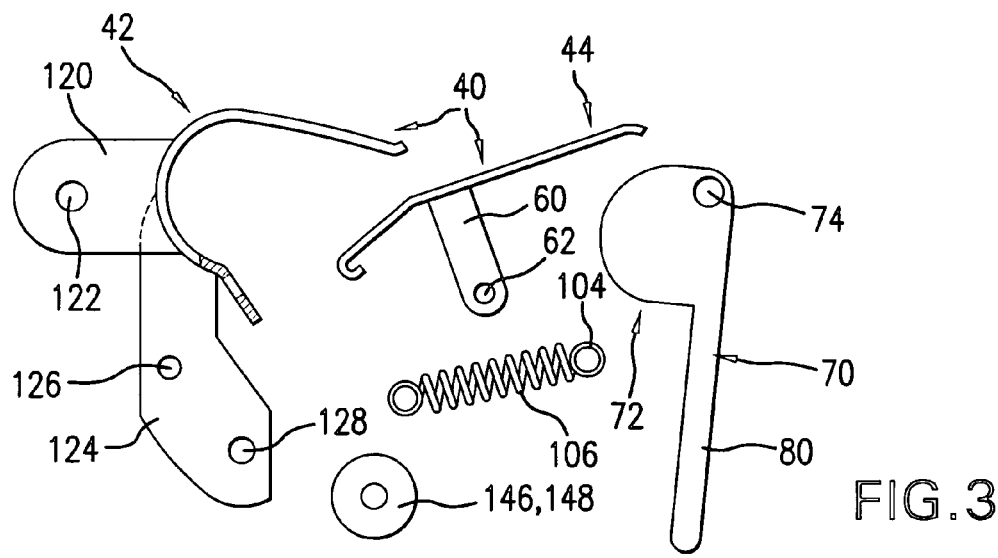
FIG. 3 is a is an exploded sketch of the clamp components of FIG. 2.
Figure 6:
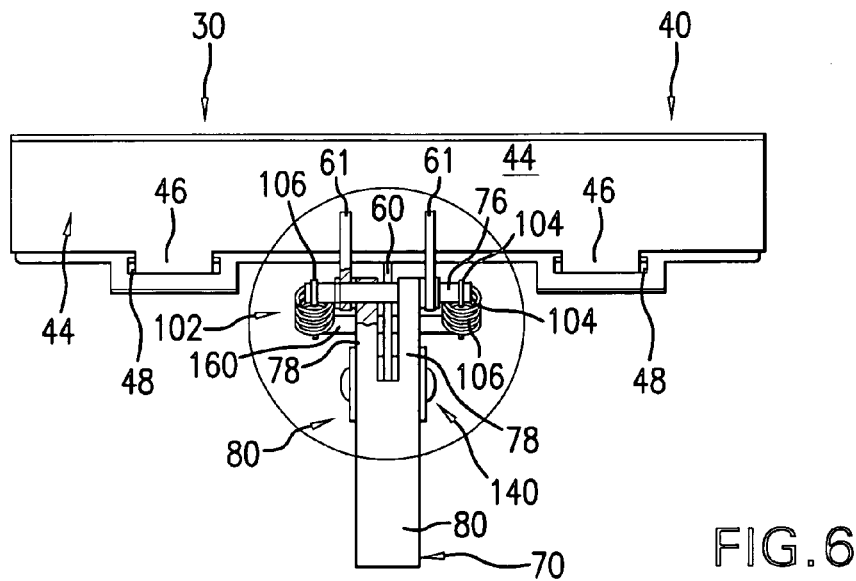
FIG. 6 is an underside plan view of the clamp sketch of FIG. 1.
Figure 7:
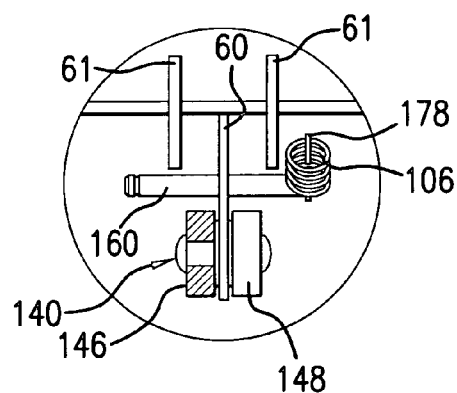
FIG. 7 is a detailed view of the circled portion of the sketch of FIG. 6.
Figure 8:
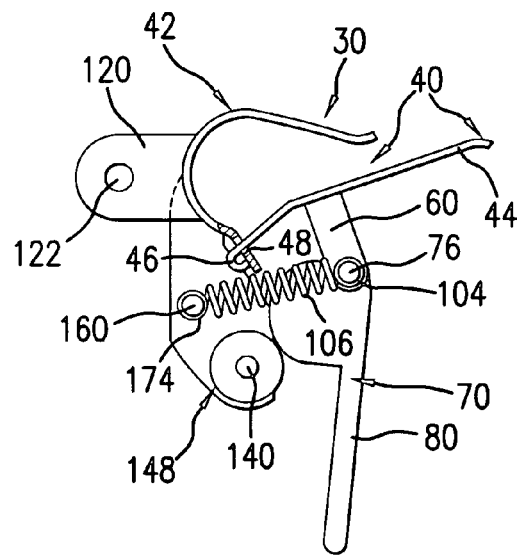
FIG. 8 is a sketch similar to that of FIG. 2 but without the representation of the device to be carried to better show details of the clamp components.
Figure 9:
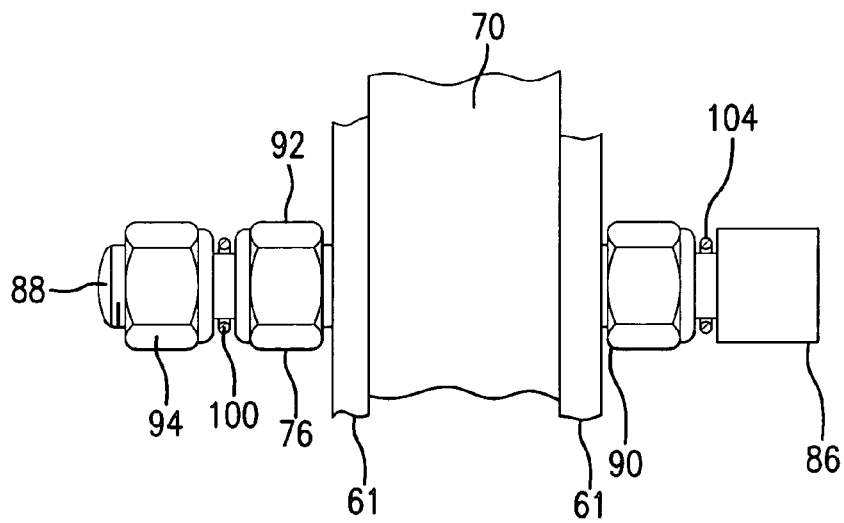
FIG. 9 is a sketch of the operating handle pivot pin somewhat enlarged to better show details thereof.

An operating handle 70 (FIGS. 1, 2, and 6) is fabricated with a camming surface 72 and a hole 74 (FIG. 3). A handle pivot pin 76 (FIGS. 2, 8 and 9) extends through hole 74 of spaced bracket parts 61 (FIG. 6) and spaced legs 78 of a body 80 of operating handle 70 to pivotally mount operating handle 70 beneath movable clamp plate 44. Handle pivot pin 76 includes: a head end 86 (FIG. 9); a threaded end 88; with Nylok type nuts 90, 92 each secured proximate a bracket part 61 all as shown in FIG. 9. Another Nylok type nut 94 is threaded onto pin 76 proximate the end of threaded end 88 and so as to be spaced from the Nylok nut 92 to provide a space between Nylok nuts 92, 94 for an end 100 of a spring 102.(FIG. 6). Nylok type nut 90 is spaced from head end 86 of pivot pin 76 to provide a space there between for an end 104 of a spring 106 (FIGS. 2, 3 and 6). Handle pivot pin 76 may also be a pin with retainer rings.

Figure 10:
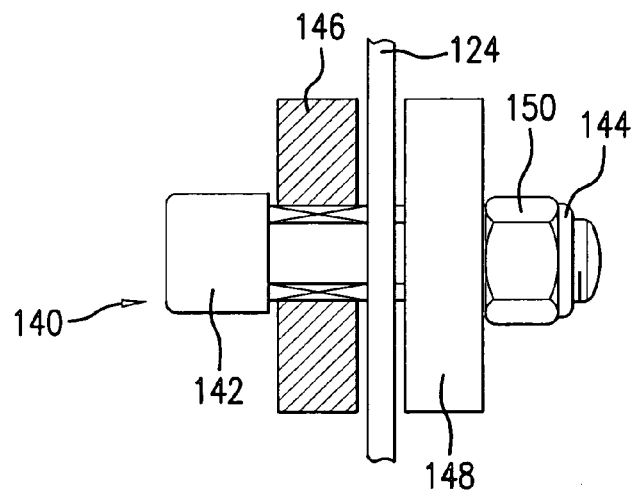
FIG. 10 is a sketch of the cam rollers mounting pin somewhat enlarged an partially cut away to better show details thereof.

Stationary plate 42 is fabricated to include a pair of spaced outwardly extending ears 120 (FIGS. 1 and 4) each of which includes at least a single hole 122 and between which a medical device, such as device shown in phantom at 32, may be connected. A leg 124 (FIGS. 2, 4 and 8) extends downwardly from stationary plate 42 and is located proximate the center thereof. Leg 124 is fabricated with a cam roller pin mounting hole 128 (FIG. 3) and a spring anchor pin hole 126. A cam roller mounting pin 140 (FIGS. 2, 6, 7, 8 and 10) extends through hole 128 and includes a head end 142 (FIG. 10) and a threaded end 144. a pair of cam rollers 146, 148 are rotatively carried by pin 140 proximate leg 124. A Nylok type nut 150 is threaded onto pin 140 to finalize assembly of the cam rollers.

Figure 11:
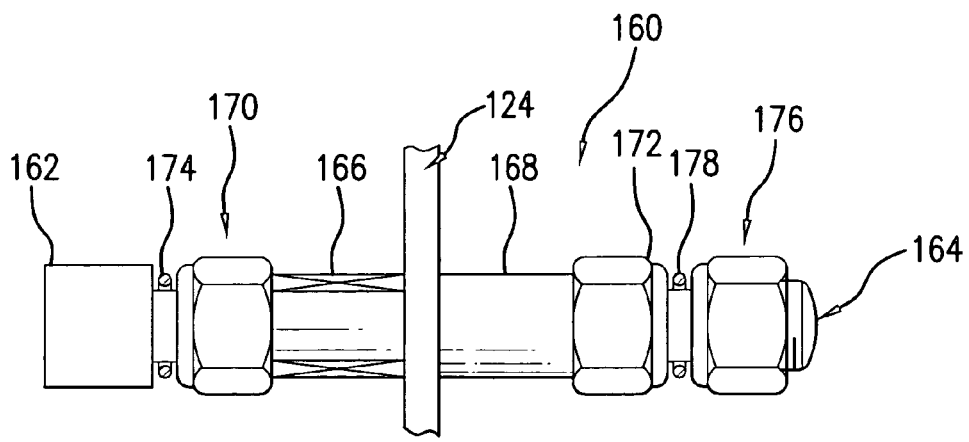
FIG. 11 is a sketch of the spring mounting pin somewhat enlarged to better show details thereof.

A spring mounting pin 160 (FIGS. 2, 3, 6, 8 and 11) is itself mounted through hole 126 (FIG. 3 of leg 124 of stationary clamp plate 42. Pin 160 includes a head end 162 (FIG. 11) and a threaded end. A pair of spacers 166, 168 are respectively positioned on pin 160 each proximate a respective side of leg 126. Nylok type nuts 170, 172 are threaded onto pin 160 proximate spacers 166, 168, respectively, to keep spacers 166, 168 in place. It should be noted that Nylok type Nut 170 is disposed on pin 160 spaced from head end 162 to provide a space for a spring end 174 of spring 106; and that a Nylok type nut 176 is disposed proximate the threaded end of pin 160 in spaced relationship from Nylok type nut 172 to provide a space for a spring end 178 of spring 102.

The action of operating handle 70, its cam surface 72 with rollers 146, 148 and springs 102, 106 is such that when operating handle 70 is rotated counterclockwise (FIGS. 2 and 8) about its pivot pin 76 clamp plates 42, 44 will be moved to a first disposition spaced one from the other and such as to facilitate disposition of clamp 30 onto a carrier; and when operating handle 70 is rotated clockwise about its pivot pin 76 movable clamp plate 44 will be moved towards stationary clamp plate 42 to a second disposition to facilitate securing clamp 30 to a carrier: as will be further explained hereinafter. The mounting of springs 102 and 104 to stationary clamp plate 42 and operating handle 70 and the co-action therewith is as an over-center toggle which will retain clamp plates 42, 44 in their respective dispositions.

Figure 12:
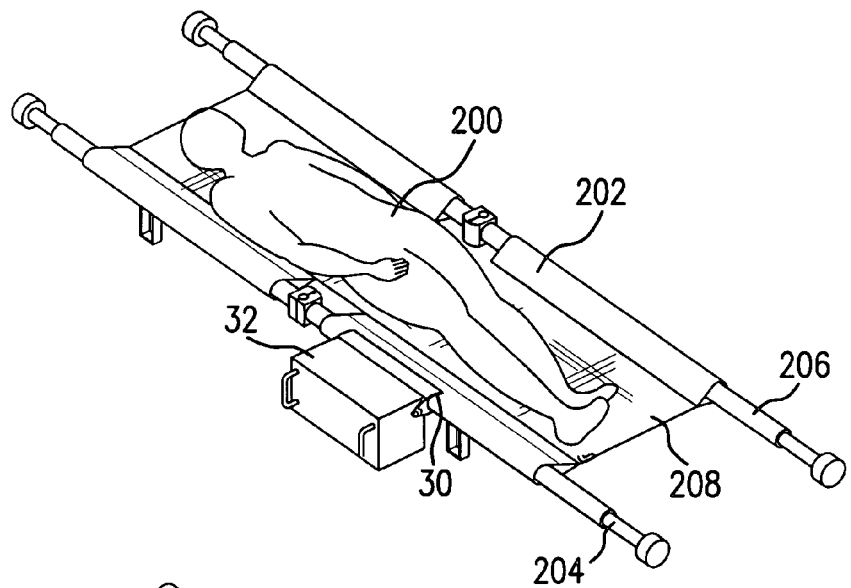
FIG. 12 is a perspective sketch of a litter with a person, in outlined phantom, disposed thereon, and with a clamp, incorporating the instant invention secured to the litter and carrying, in phantom a medical device.

A preferred use for clamp 30 is schematically shown in FIG. 12 wherein a possibly injured person 200 is disposed on a litter 202 to be carried to a transport, such as a helicopter, ambulance, medical cargo airplane or the like to be taken to a medical facility. The person could be a military combatant, civilian injured by a terrorist attack or bombing, or the like person in need of being moved to a medical facility. While person 200 is shown on a litter 202 they may just as well be on a stretcher, in a basket type patient mover or the like.

Figure 13:
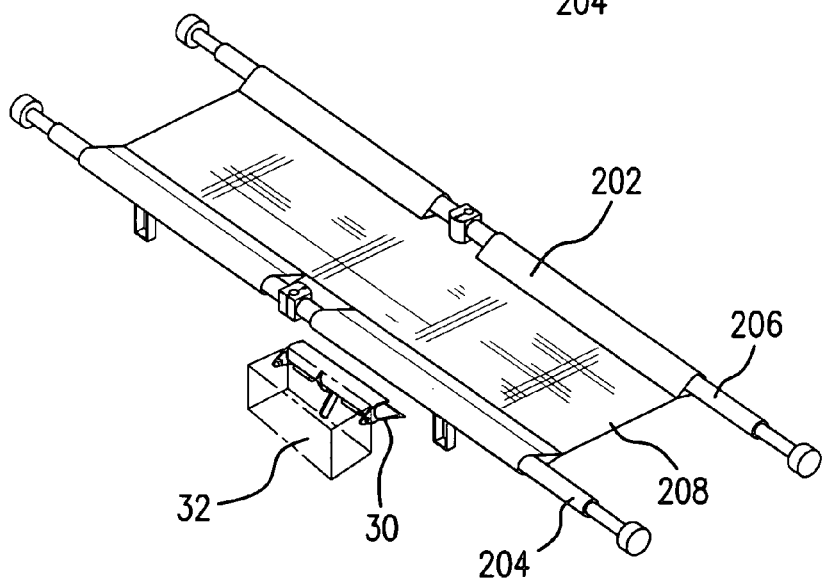
FIG. 13 is a perspective sketch of the litter of FIG. 12 with a clamp, incorporating the instant invention in position to be secured to the litter and with a medical device, in phantom, carried by the clamp.

Clamp 30, of the instant invention as described above, is shown in the sketch of FIG. 13 as positioned to be secured to a pole 204 of litter 202. Litter 202 (FIGS. 12 and 13) also includes another pole 206 with a fabric 208, of conventional and appropriate material, spanning poles 204, 206. In FIG. 12 clamp is shown secured to pole 204; it being understood that clamp 30 may just as well be secured to pole 206. It should be noted that clamp 30 is shown in FIGS. 12 and 13 as carrying a medical device to be further described hereinafter.

Figure 14:
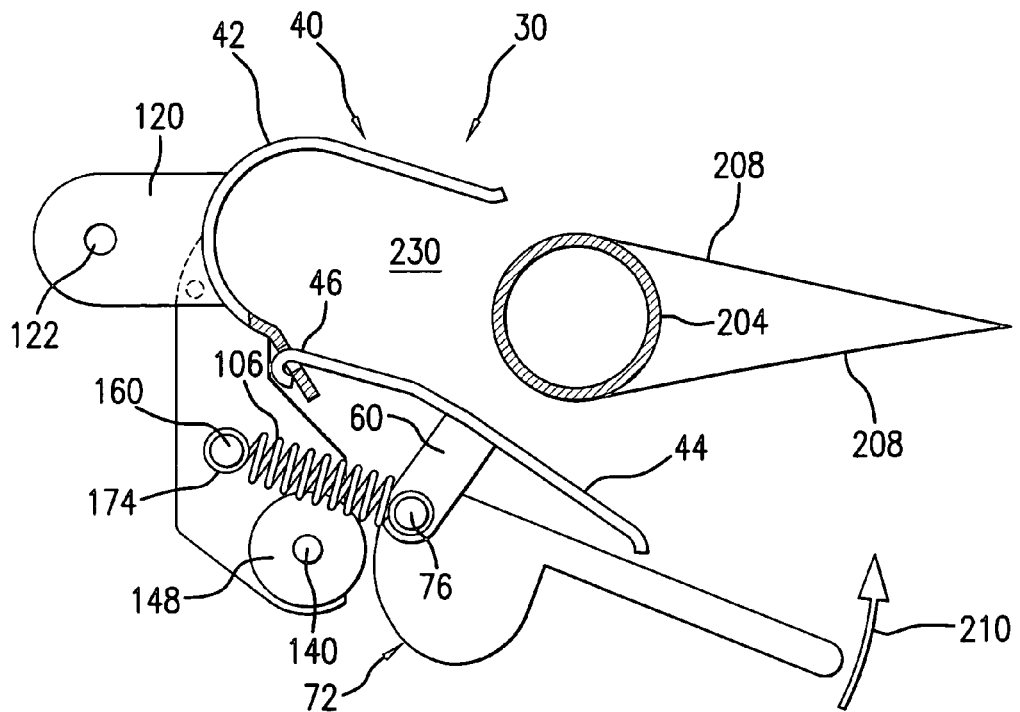
FIG. 14 is a side elevation of the litter clamp about to be secured to a litter but only showing a portion of the fabric of the litter and with the corrying pole of the litter in section.
Figure 15:
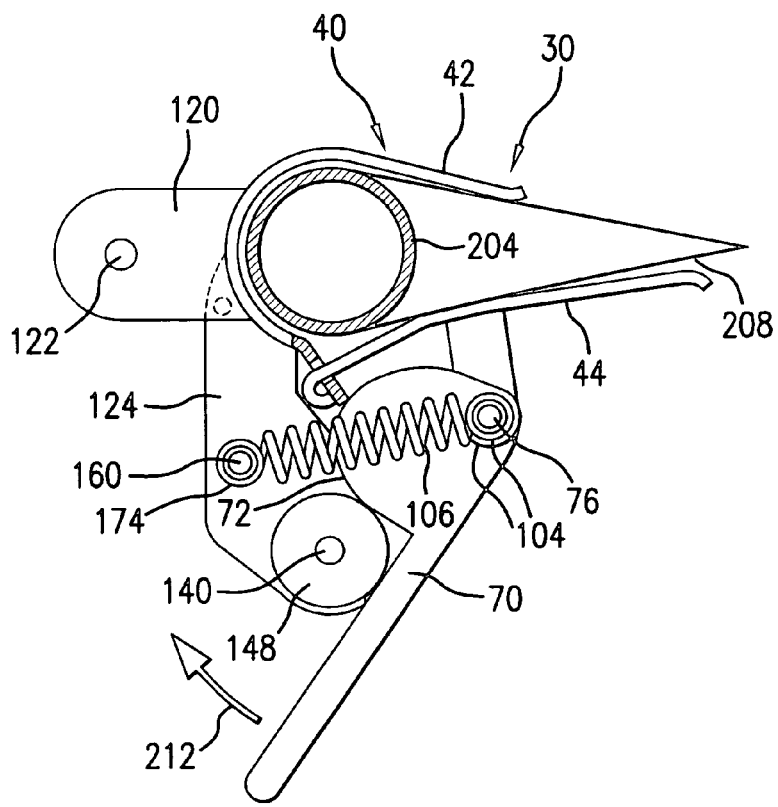
FIG. 15 is a side elevation of the litter clamp secured to a litter but only showing a portion of the fabric of the litter and with the corrying pole of the litter in section.

FIG. 14 shows clamp 30 disposed in its first disposition with operating handle rotated counterclockwise about it pivot pin 76 (in the direction of arrow 210). When operating handle 70 is so rotated about its pivot pin 76 to its first disposition cam surface 72 of operating handle 70 co-acts with rollers 146, 148 and springs 104, 106 so that hinge tabs 46 of movable clamp plate 44 pivot in openings 48 of stationary clamp plate 42 to fully move movable clamp plate 44 away from stationary clamp plate 42 to form an opening 230 of a size to accept litter pole 202 and its covering fabric 208. When clamp 30 is fully seated against fabric 208 of pole 204 operating handle 70 may be rotated in the clockwise direction about its pin 76, in the direction of arrow 212, and the co-action of cam surface 72 with rollers 146, 148 and of springs 104,106 results in the pivoting of hinge tabs 46 within openings 48 of stationary clamp plate 42 and the closing of space 230 to securely hold clamp 30 onto litter pole 204. While clamp pole 104 has been shown as a hollow tube of circular configuration it might just as well be solid, of any selected material and cross-sectional configuration. The configuration of at least stationary clamp plate 42, and possibly that of movable clamp plate 44, may just as well be fabricated to facilitate the secure fir of the clamp plate mechanism to the respective pole of a litter, stretcher, basket or the like. While the example of FIGS. 16-18 have been shown with a single clamp and medical device it should be understood that more then one clamp each carrying a medical device may also be used on a single litter.

Figure 16:
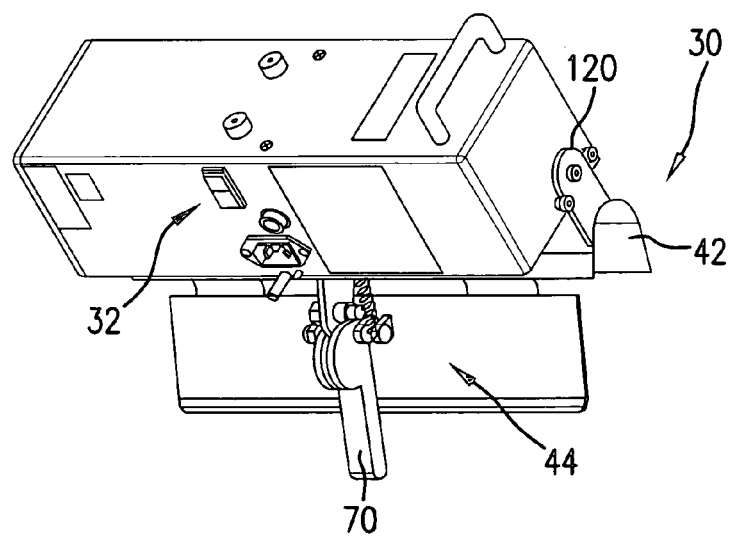
FIG. 16 is a sketch of the clamp of the instant invention carrying a medical device.
Figure 17:
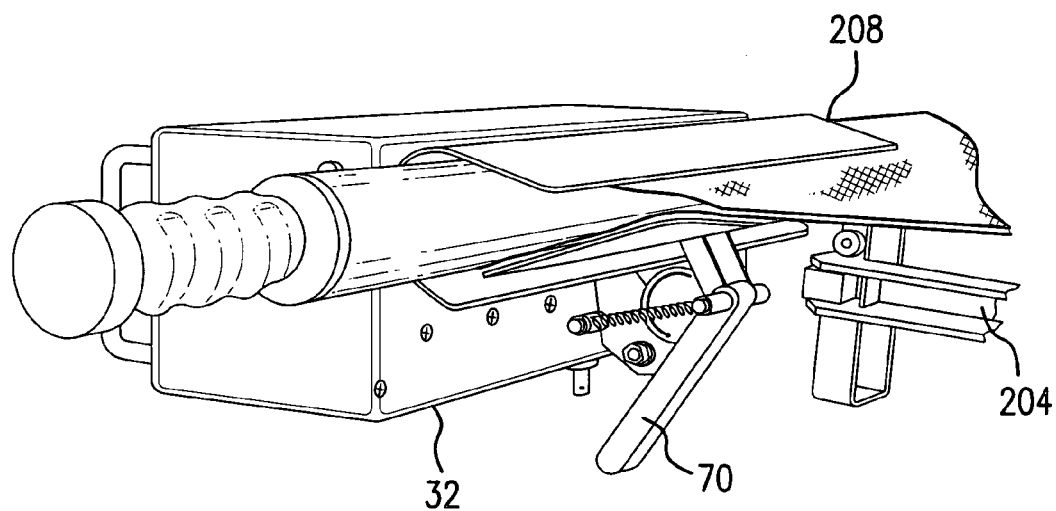
FIG. 17 is a perspective of the clamp of the instant invention, carrying a medical device, and secured to a litter like the litter of FIGS. 12 and 13.
Figure 18:
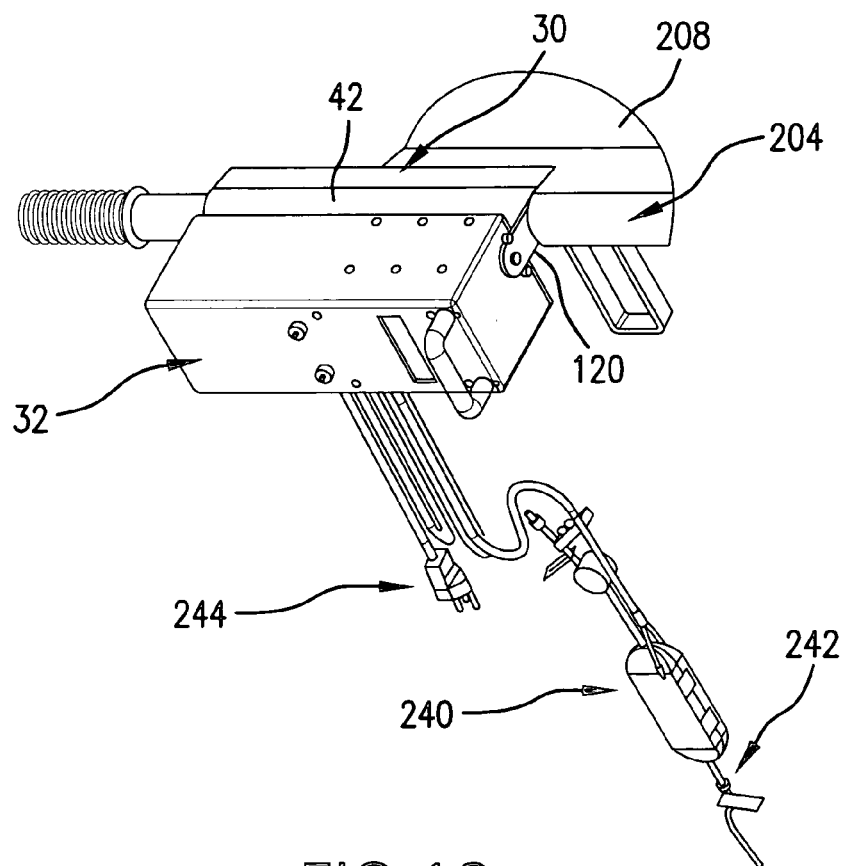
FIG. 18 is a sketch of the clamp, incorporating the instant invention, carrying a medical device, such as a power supply for an infusate warmer, secured to a litter (Only partially shown) With an infusate warmer and an IV set shown as it would be attached to the medical device for use in treating a person when carried on the litter.

The medical device 32, as shown in FIGS. 16, 17 and 18, is, by way of example, a power supply for controlling and supplying power to an infusate warmer 240 disposed within an IV set 242 and to be applied to the person 200 when disposed upon litter 202. A conventional electrical plug 244 may also be carried by medical device 32 to charge batteries therewithin if and when required.

It can be seen from the above that the clamp of the instant invention, while constructed with a minimum number of parts, functions to securely attach a medical device to a litter pole. That the size, configuration and disposition of the constituent components of the clamp, and its disposition against the fabric of the litter, are selected to offset tendencies of the medical device to rotate, due to momentum and on its own, about the litter pole. That self same construction of the clamp provides a secure disposition, and ability to carry the weight, of the medical device with the litter and person carried thereby to remain so secured to the litter even though the transport that carries the litter and person to a medical facility may be subjected to rapid, unintended and unavoidable sudden movement as established by being subjected to and accepted as air worthy by the military. The Air worthy certification referred to is for helicopter transport. At times the fabric of the litter is a polymeric cloth which is very smooth and the use of a clamp with "teeth", or otherwise serrated, might leave marks on the pole and also gradually cause the plastic mesh of the fabric to deteriorate. The design of the instant invention accomplishes a secure placement without such damage to the litter pole or its fabric.

Since various changes could be made in the above constructions without departing from the scope of the invention, it should be understood that all matter contained in the above description and/or shown in the accompanied drawing should be interpreted as illustrative and not in a limited sense.

What is claimed is:

1. A clamp, to be securely clamped to an object, comprising:
    (a) a clamp mechanism including a fixed clamp plate and a movable clamp plate pivotally secured together for movement towards and away from each other;
    (b) an operating handle pivotally carried by said movable clamp plate;
    (c) said operating handle pivotally mounted for movement between a first disposition and a second disposition and including a cam surface;
    (d) said fixed clamp plate including a pair of spaced ears to which a medical device may be secured;
    (e) said fixed clamp plate including cam rollers disposed for co-action with said cam surface of said operating handle; and
    (f) an over-center toggle-type spring mechanism interconnecting said operating handle and said fixed clamp plate such that: in said first disposition of said operating handle said movable clamp plate and said fixed clamp plate are spaced from each other by a first predetermined amount wherein said clamp mechanism may be applied to an object to which said clamp mechanism is to be securely clamped; and in said second disposition of said operating handle said movable clamp plate and said fixed clamp plate are moved toward each other until they are spaced from each other by a second predetermined amount wherein said clamp mechanism, if and when applied to the object, will be securely clamped to the object.

2. The clamp of claim 1, wherein, the object to which the clamp is to be secured is a litter upon which a person may be placed for transportation to a medical facility.

3. The clamp of claim 2 wherein the clamp is secured to a litter sufficiently to meet military helicopter air worthy requirements.

4. The clamp of claim 3, wherein the medical device which is to be secured by the clamp is a power supply for an infusate warmer.

5. The clamp of claim 2, wherein, the litter includes a pair of spaced poles each threaded through an opening defining a respective side end of a fabric carrier spanning the respective poles and wherein the clamp not only grips one of the respective poles but also the fabric associated with the respective pole to which the clamp is to be secured and upon which a person may be placed for transportation to a medical facility.

6. A clamp, to be securely clamped to an object, comprising:
    (a) a clamp mechanism including a fixed clamp plate and a movable clamp plate pivotally secured together for movement towards and away from each other;
    (b) an operating handle pivotally carried by said movable clamp plate;
    (c) said operating handle pivotally mounted for movement between a first disposition and a second disposition and including a cam surface;
    (d) said fixed clamp plate including cam rollers disposed for co-action with said cam surface of said operating handle; and
    (e) an over-center toggle-type spring mechanism interconnecting said operating handle and said fixed clamp plate such that: in said first disposition of said operating handle said movable clamp plate and said fixed clamp plate are spaced from each other by a first predetermined amount wherein said clamp mechanism may be applied to an object to which said clamp mechanism is to be securely clamped; and in said second disposition of said operating handle said movable clamp plate and said fixed clamp plate are moved toward each other until they are spaced from each other by a second predetermined amount wherein said clamp mechanism, if and when applied to the object, will be securely clamped to the object.

7. The clamp of claim 6, wherein the object to which the clamp is to be applied is a carrier; and wherein,
    (a) said first predetermined amount of said space between said fixed clamp plate and said movable clamp plate, when disposed in their respective first dispositions, being sufficient to permit the clamp to be placed over a portion of the carrier to which the clamp is to be secured; and (b) said second predetermined amount of said space between said fixed clamp plate and said movable clamp plate, when disposed in their respective second dispositions, being sufficient to secure the clamp to a portion of the carrier.

8. A clamp, to be securely clamped to an object, comprising (a) a clamp mechanism including a first clamp plate and a second clamp plate pivotally secured together for movement towards and away from each other;

(b) an operating handle pivotally carried by said second clamp plate;

(c) said operating handle including a cam surface;

(d) said first clamp plate including cam rollers disposed for co-action with said cam surface of said operating handle; and (e) an over-center toggle-type spring mechanism interconnecting said operating handle and said first clamp plate such that in a first disposition of said operating handle said second clamp plate and said first clamp plate are spaced from each other by a first predetermined amount wherein said clamp mechanism may be applied to an object to which the clamp mechanism is to be securely clamped to, and in a second disposition of said operating handle said second clamp plate and said first clamp plate are moved toward each other until they are spaced from each other by a second predetermined amount wherein said clamp mechanism, if and when applied to the object, will be securely clamped to the object.

9. The clamp of claim 8, wherein the object to which the clamp is to be applied is a carrier; and wherein:

(a) said first predetermined amount of said space between said first clamp plate and said second clamp plate, when disposed in their respective first dispositions, being sufficient to permit the clamp to be placed over a portion of the carrier to which the clamp is to be secured; and (b) said second predetermined amount of said space between said first clamp plate and said second clamp plate, when disposed in their respective second dispositions, being sufficient to secure the clamp to a portion of the carrier.

10. The clamp of claim 8, wherein, the carrier to which the clamp is to be secured is one upon which a person may be placed for transportation to a medical facility.

11. The clamp of claim 8 wherein the clamp is secured to a litter sufficiently to meet Military helicopter air worthy requirements.

12. A clamp, to be securely clamped to an object, comprising (a) a clamp mechanism including a first clamp plate and a second clamp plate pivotally secured together for movement towards and away from each other;

(b) wherein, said first clamp plate includes a pair of spaced ears to which a device may be secured.

(c) an operating handle pivotally carried by said second clamp plate;

(d) said operating handle including a cam surface;

(e) said first clamp plate including cam rollers disposed for co-action with said cam surface of said operating handle; and (f) an over-center toggle-type spring mechanism interconnecting said operating handle and said first clamp plate such that in a first disposition of said operating handle said second clamp plate and said first clamp plate are spaced from each other by a first predetermined amount wherein said clamp mechanism may be applied to an object to which the clamp mechanism is to be securely clamped to, and in a second disposition of said operating handle said second clamp plate and said first clamp plate are moved toward each other until they are spaced from each other by a second predetermined amount wherein said clamp mechanism, if and when applied to the object, will be securely clamped to the object.

13. The clamp of claim 12 wherein said device is for medical purposes.

14. The clamp of claim 13, wherein, the carrier to which the clamp is to be secured is one upon which a person may be placed for transportation.

15. The clamp of claim 12, wherein the medical device which is to be secured in place by the clamp is a power supply for an infusate warmer.

* * * * *